UNITED STATES PATENT OFFICE.

ERNST C. KRUEGER AND JOHN W. MANN, OF CHICAGO, ILLINOIS.

PARTING COMPOUND.

996,590.  Specification of Letters Patent.  Patented June 27, 1911.

No Drawing.   Application filed February 13, 1911.  Serial No. 609,400.

*To all whom it may concern:*

Be it known that we, ERNST C. KRUEGER and JOHN W. MANN, citizens of the United States, and residents of Chicago, in the county of Cook and State of Illinois, have invented certain new and useful Improvements in Parting Compounds; and we do hereby declare that the following is a full, clear, and exact description thereof, reference being had to the accompanying drawings, and to the characters of reference marked thereon, which form a part of this specification.

This invention relates to improvements in what are known as parting compounds, or powders for dusting the patterns used in making sand molds in foundries and for dusting sand molds at the parting line to facilitate the parting of the sand from the patterns and the sand of one part of the mold from that of the other part of the mold.

Among the objects of the invention is to provide a parting compound which is economical to make, which is non-adhesive so that it will not stick to the patterns, even when the molding sand is heated, which insures the ready parting of the mold which is infusible so that it will not melt, which is non-hygroscopic so that it will not absorb moisture and which does not burn away to leave a residue when the molten metal is poured into the mold.

Our improved parting compound is made by impregnating and coating a porous fine grain substance, such as a decomposed silicious lime stone, or amorphous slag or other porous, non-hygroscopic amorphous substance, with an oleaginous filler and coating, such as linseed oil, cottonseed oil or oil bearing substances, preferably vegetable oil, and after saturating or impregnating the porous material, subjecting it to heat to drive off the vapor from the oleaginous filler and to burn away other portions of the filler, the resultant powder being screened or riddled to separate the finer from the coarser particles thereof.

In practically producing our parting compound the oleaginous constituent of the compound is first mixed with the porous substance and the mixture is heated to a temperature from two hundred and fifty to three hundred and fifty degrees Fahrenheit, being thoroughly stirred during the heating process, and thereafter the heated mixture is poured out and allowed to slowly cool. During the heating of the mixture it becomes plastic so that it may be readily stirred, and a portion of the oleaginous constituent is driven off by evaporation and by burning, the remainder of the oleaginous constituent being absorbed in the pores of the porous substance as well as coating the particles.

The proportions of the porous substance and the oleaginous constituent will depend somewhat on the capacity of the porous substance to absorb the oleaginous constituent. In practice we have used, for a batch of fifty pounds of the porous substance, from one and one-half to two and one-half pints of the oleaginous constituent, depending somewhat upon the character of the constituent.

We have used as the porous, silicious substance a decomposed silicious lime stone, and for the oleaginous constituent we have found linseed oil and cotton seed oil well adapted to produce the resultant mixture desired. Experiments have also been made with crushed linseed and other oil bearing seed and substances, which experiments have indicated satisfactory results. The resultant mixture with these constituents is a light yellowish powder of low specific gravity, non-adhesive, amorphous and non-hygroscopic. We may also employ other forms of silicious substances or marl.

We have found that the composition, after the heat has been extracted therefrom, cools in the form of a powder having various size particles, and the powder is reduced to a usable mesh by a screen or riddling operation. The particles which are too large to be used may be crushed to the desired mesh or mixed with the porous substance when another batch of the powder is to be made. Thus the necessity for grinding the composition after it has become cooled is avoided.

In practice we have found that the parting compound thus produced is entirely infusible, and does not tend to stick to the patterns when used with heated sand as do parting compounds which have a resinous constituent.

We claim as our invention:—

1. A parting compound consisting of a fine powder composed of an oleaginous substance incorporated in and mixed with a porous, decomposed silicious limestone.

2. A parting compound composed of a porous, silicious substance impregnated under heat with a vegetable oil.

In testimony, that we claim the foregoing as our invention we affix our signatures in the presence of two witnesses, this 16th day of February A. D. 1911.

ERNST C. KRUEGER.
JOHN W. MANN.

Witnesses:
 WILLIAM L. HALL,
 WILLIAM GOLDBERGER.